Nov. 5, 1968  S. A. ISAKSON  3,408,681
GATHERING PAN STRUCTURES
Filed July 26, 1965
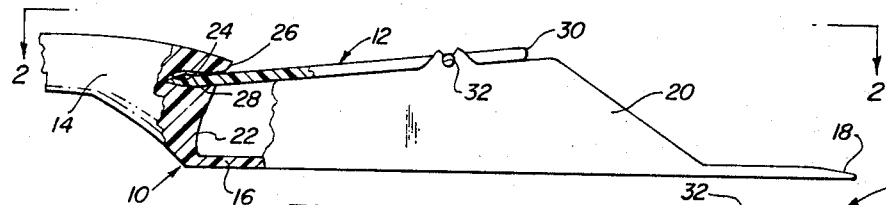
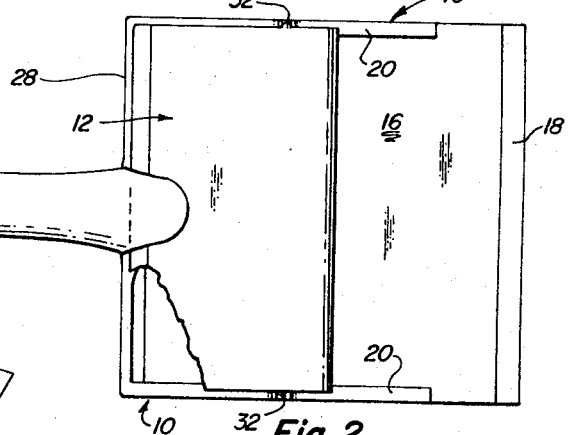
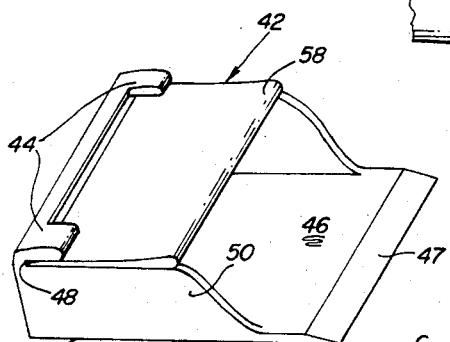
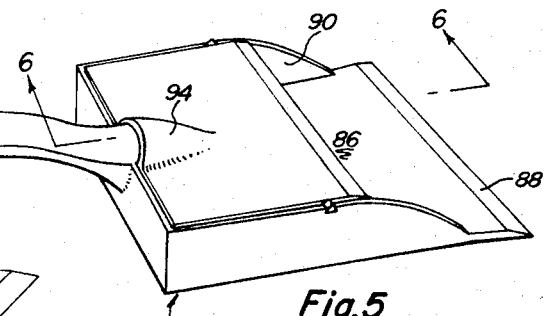
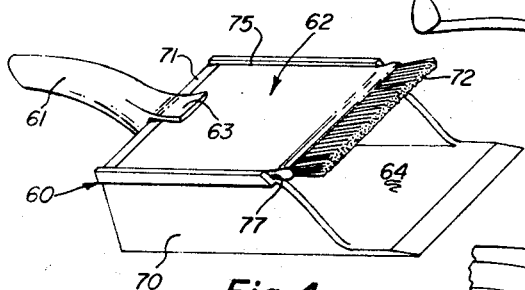
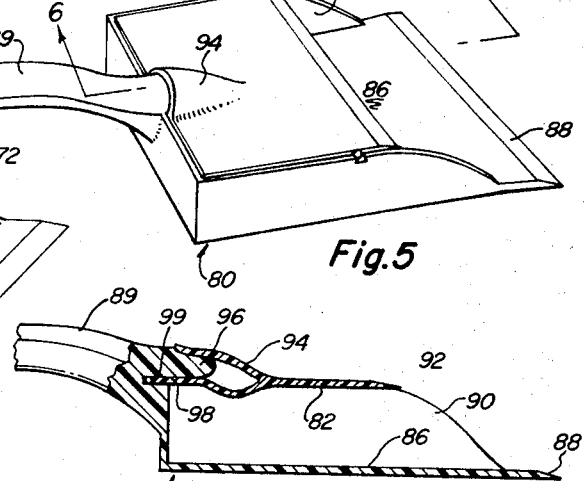
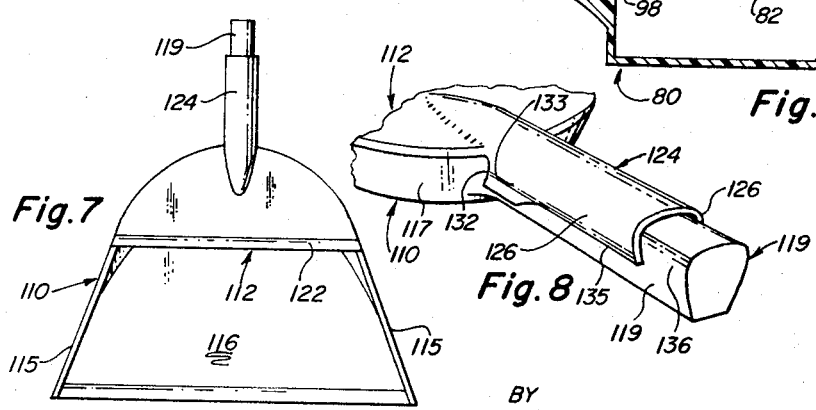
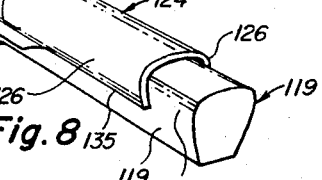
STIG A. ISAKSON
INVENTOR
BY
BUCKHORN, BLORE, KLARQUIST & SPARKMAN
ATTORNEYS United States Patent Office 3,408,681
Patented Nov. 5, 1968

3,408,681
GATHERING PAN STRUCTURES
Stig A. Isakson, 5751 SW. 54th Ave.,
Portland, Oreg. 97221
Filed July 26, 1965, Ser. No. 474,631
3 Claims. (Cl. 15—257.2)

ABSTRACT OF THE DISCLOSURE

Gathering pan structures in which pusher members are secured by detents in positions covering the rear portions of pans and are detachable from the pans for use as pushers. One pusher member is secured in a slotted gripping portion at the rear of the pan. Another pusher member has a handle which snaps over the handle of the pan and a third pusher member has a socket adapted to fit over a projection of the pan.

Description

This invention relates to gathering pan structures, and more particularly to dust pans and having quick-detachable pushing members.

An object of the invention is to provide new and improved gathering pan structures.

Another object of the invention is to provide dust pans having quick-detachable pusher members.

A further object of the invention is to provide a dust pan structure having a pusher member quickly detachable from a dust pan and forming the cover of the dust pan.

Another object of the invention is to provide a dust pan structure including a dust pan and a pusher member provided with flexible holding portions by which the pushing member is secured to the dust pan for quick detachment therefrom.

Yet another object of the invention is to provide a dust pan having clamping means at the rear end thereof, together with a scraper member having a scraper edge and a handle edge opposite thereto and adapted to be pushed into the clamping means and held securely in a position covering the rear portion of the dust pan.

A still further object of the invention is to provide a gathering pan structure provided with a pan and a pusher having a thumb hole therein adapted to fit over a projection of the pan and interlock therewith to hold the pusher in a position covering the upper rear portion of the gathering pan.

Another object of the invention is to provide a gathering pan and a pusher member quickly detachable from the upper, rear portion thereof, serving as a cover for the pan, and having a scraping edge and a brush portion at opposite edges thereof.

The invention provides gathering pan structures, each of which includes a gathering pan and a pusher member which is quickly attachable to and detachable from the gathering pan, preferably in a position when attached to the gathering pan in which the pusher member forms the cover of the gathering pan, in a gathering pan structure forming a specific embodiment of the invention, there is provided a gathering pan open at the top and having a notch at the upper, rear portion thereof into which is inserted a blade portion of a scraper member which is held thereby in a position forming the lid of the gathering pan structure. The lid may be provided with a brush portion at the edge thereof opposite to the scraping edge, or, as an alternate construction, may be provided with a thumb hole at the edge thereof opposite to the scraper edge. The scraper may be provided of flexible material and the notch have a configuration in which the portion of the scraper inserted thereinto is gripped and pressed in a direction in which the scraper overlies the upper edges of the sides of the gathering pan. The sides of the gathering pan and the forward portion of the pusher member may be provided with interlocking or frictionally interengaging portions to hold the forward portion of the pusher member in a position covering the dust pan.

A complete understanding of the invention may be obtained from the following detailed description of gathering pan structures forming specific embodiments thereof, when read in conjunction with the appended drawings, in which:

FIG. 1 is a partially sectional, side elevation view of a gathering pan structure forming one embodiment of the invention;

FIG. 2 is a top plan view, with portions thereof broken away, to more clearly illustrate the structure, of the gathering pan structure of FIG. 1;

FIG. 3 is a perspective view of a gathering pan structure forming an alternate embodiment of the invention;

FIG. 4 is a perspective view of the gathering pan structure forming an alternate embodiment of the invention;

FIG. 5 is a perspective view of a gathering pan structure forming an alternate embodiment of the invention;

FIG. 6 is a vertical, sectional view taken substantially along line 6–6 of FIG. 5;

FIG. 7 is a top plan view of a gathering pan structure forming an alternate embodiment of the invention; and FIG. 8 is an enlarged, fragmentary, perspective view of the gathering pan structure of FIG. 7.

Referring now in detail to the drawings, there is shown in FIGS. 1 and 2 a gathering pan structure including a gathering pan 10 and a pusher member 12. The gathering pan 10 includes a handle 14 and a pan bottom 16 having a beveled or tapered forward edge 18. Side flanges 20 and rear wall 22 complete the gathering pan. A forwardly opening, rearwardly and upwardly sloping, deep notch 24 formed at the upper end of the rear wall 22 in the handle 14 has a flared or enlarged opening 26 into which a tapered, scraping edge or blade 28 of the pusher member 12 is designed to enter.

The scraper member 12 preferably is composed of a flexible material, and the scraper edge 28 thereof of the portion immediately to the right thereof, as viewed in FIG. 1, is adapted to be deflected when it is slid into the notch 24 and be stressed thereby, to bend the portion adjacent the scraper edge 28 slightly upwardly, as viewed in FIG. 1, to press the righthand edge portion downwardly against the upper edge portions of the sides 20. This holds the member 12 in a position forming the cover or lid of the gathering pan and permits quick release therefrom merely by a user grasping a handle portion 30, lifting the handle portion 30 to release snap type detent or stop connections 32, and then pulling the member 12 from the slot 24. The member 12 is thus quickly detachable from the pan 10. The member 12 is quickly attachable to the pan 10 after using, merely by the user holding the handle portion 30, jamming or wedging the scraper edge portion 28 into the slot 24, and swinging the righthand portion of the member 12 downwardly to snap the interlocking detent connections 32 together.

In using the gathering pan structure 10, which may be either a dust pan or a crumb pan, the member 12 may be grasped by the handle portion 30 thereof and detached from the pan 10. The member 12 then may be used to scrape or push crumbs, dust, trash or any material that is desired to be moved into the gathering pan, after which, without changing the grip on the member 12, the free edge portion, which is the scraper edge 24, is inserted into the notch 24 and the member 12 swung downwardly to interlock the detent connections 32. The member 12 then is held securely in a position forming the lid or cover of the pan.

In a gathering pan structure forming an alternate embodiment thereof shown in FIG. 3, a gathering pan 40, which has no rearwardly projecting handle thereon, has notched clamps 44 for quickly attaching to and detaching from the dust pan a pusher member 42. The pusher member 42 is composed of a semi-flexible or resilient material such as, for example, a flexible metal or a flexible plastic. The scraper member 42 has a scraper edge portion 48 and adapted to be jammed or wedged into the clamps 44 and held thereby with the clamps pressing the righthand end of the member 42 downwardly against side walls 50 of the pan 40. The side walls are mounted on bottom 46 of the dust pan, and the pan also has a tapered scraping edge 47. The scraper member 42 has a rounded handle portion 58 and is sufficiently wide that it is flush with the outer faces of the side walls 50 when secured in position covering the pan 40.

A gathering pan structure forming an alternate embodiment of the invention shown in FIG. 4 includes a pan 60 having a handle 61 provided with a flexible holding lip 63 above the top of rear wall 64 of the pan and overhanging bottom 65 thereof. The gathering pan 60 also includes side walls 70. A pusher member 62 is provided with a scraper edge 71 disposed opposite to a short bristle brush 72 secured in a gripping or handle portion. The member 62 is composed of fairly stiff material and is adapted to be gripped by the flexible lip 63 and held in a position in which side edges 75 of the member 62 are pushed into rabbet portions 77 positioned at the top edges of the side walls 70 of the pan. The scraper edge 71 is sufficiently sharp to effectively scrape material or push material into the pan 60, but is sufficiently blunted that it may be grasped by the user without injury to him when the brush 72 is used to brush material into the pan 60. The side walls 70 are semi-flexible and the rabbeted top portions are pushed apart slightly by the member 62 when it is pressed downwardly thereinto so that the side walls frictionally grip the side edges of the member 62.

A gathering pan structure (FIGS. 5 and 6), forming an alternate embodiment of the invention, includes a gathering pan 80 and a pusher or scraper member 82 adapted to form the cover or lid of the pan and to be quickly attached to and quickly detached from the pan. The pan 80 includes a bottom 86 and side walls 90, the bottom having a tapered or somewhat sharpened edge 88, and also being provided with a handle 89 of somewhat stiff or somewhat rigid material. The member 82 is preferably composed of flexible material and has a scraper edge 92 at the forward edge thereof. The member 82 is provided with a thumbhole portion 94 at the rear edge thereof which is adapted to fit tightly on a projection 96 of the handle 89 to secure the scraper member 82 in a position covering the pan 80, and pressed against the upper edges of the sides or flanges 90. The thumbhole portion 94 has a projection 98 which fits with an interference fit into a slot 99 in the handle 89 to securely hold the scraper member 82 on the pan 80.

A gathering pan structure (FIGS. 7 and 8) includes a gathering pan 110 and a pusher or scraper member 112 serving as the cover or lid for the pan and quickly attachable to and detachable from the pan. The pan includes a bottom 116 having a somewhat sharpened edge 118, sidewalls 115, rear wall 117 and a handle 119. The pan is composed of somewhat stiff or rigid material such as sheet metal or a plastic. The member 112 is preferably composed of somewhat flexible sheet material and has a scraper edge 122 at the forward edge thereof and has a handle portion 124, which is generally U-shaped in transverse cross section. Sides 126 of the handle portion 124 are adapted to be pushed apart when the handle portion 124 is pushed downwardly over the handle 119 and resiliently grip the handle 119 to hold the member 112 securely on the pan while permitting easy removal of the member from the pan and easy attachment of the member to the pan in a position covering the rear portion of the forward ends of forward portions 133 of the sides 126 and engage the rear wall 117 of the pan to position the member 112 on the pan.

The outer or free edge portions of the forward portions 133 flare somewhat away from each other to facilitate snapping the handle portion 124 onto the handle 119. The rearward portions of the sides 126, beyond the forward portions 133, converge somewhat toward each other proceeding toward free, bottom edges 135 thereof so that the edges 135 extend under widest portion 136 of the handle 119 and hold the cover firmly on the pan. The handle portion 119 is U-shaped in transverse cross section and is of resilient material so that it can be sprung off of and onto the handle 119 and firmly grips or clasps the handle 119.

The above described gathering pan structures permit cleaning up crumbs, dirt, debris and the like without the necessity of getting the broom and without any loose or cumbersome structures on the gathering pans themselves. The pusher members blend into the pans, and may be quickly detached from and attached to the pans. The gathering pan structures are rugged and durable in construction, are easy to operate, and are attractive in appearance.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a gathering pan structure,
   a gathering pan having a pan portion and a handle projecting rearwardly therefrom,
   and a scraper member adapted to substantially completely cover the rear portion of the pan and having a rearwardly projecting handle portion generally U-shaped in transverse cross-section adapted to fit over and resiliently and detachably grip the handle of the pan to detachably secure the scraper member to the pan, in a position covering the rear portion of the pan.
2. In a gathering pan structure,
   a gathering pan having a pan portion provided with a bottom, side walls and a rear wall and a handle projecting rearwardly from the upper portion of the rear wall of the pan portion,
   and a cover member having a cover portion provided with a forward scraper edge and adapted to cover the rearward portion of the pan portion and rest on the upper edges of the side walls,
   the cover member also having a rearwardly projecting handle portion generally U-shaped in transverse cross section and adapted to fit over and resiliently grip the handle of the pan.
3. The gathering pan structure of claim 2 wherein the handle portion of the cover member has a pair of stops at the forward end thereof for engaging the rear side of the rear wall of the pan portion.

References Cited

UNITED STATES PATENTS

| | | | |
|---|---|---|---|
| 1,984,491 | 12/1934 | Ozdobinski | 15—257.2 |
| 2,782,615 | 2/1957 | Johnson | 15—257.1 |
| 401,126 | 4/1889 | Brown. | |
| 445,278 | 1/1891 | Chubb | 15—257.1 |
| 2,477,876 | 8/1949 | Jaffa | 15—105 |
| 2,637,588 | 5/1953 | Burke | 15—257.6 X |
| 2,651,925 | 9/1953 | Lawrence | 15—257.1 |

FOREIGN PATENTS 931,674 8/1955 Germany.

ROBERT L. BLEUTGE, *Primary Examiner.*

UNITED STATES PATENT OFFICE
CERTIFICATE OF CORRECTION

Patent No. 3,408,681 November 5, 1968

Stig A. Isakson

It is certified that error appears in the above identified patent and that said Letters Patent are hereby corrected as shown below:

Column 4, line 18, "in a position covering the rear portion of" should read -- Depending stop shoulders 132 are formed at --.

Signed and sealed this 3rd day of March 1970.

(SEAL)
Attest:

Edward M. Fletcher, Jr.  WILLIAM E. SCHUYLER, JR.
Attesting Officer  Commissioner of Patents